United States Patent Office

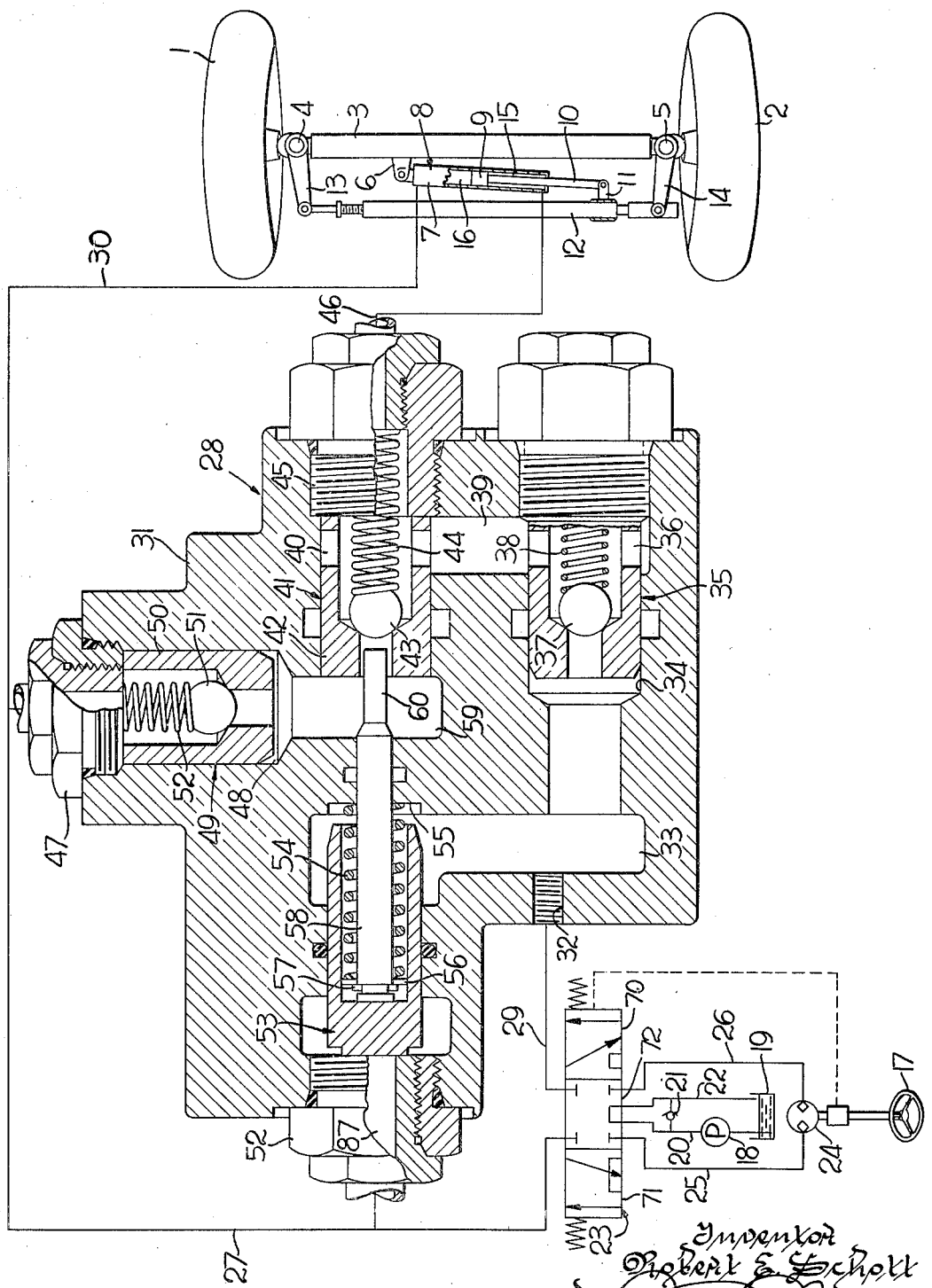

3,497,032
Patented Feb. 24, 1970

3,497,032
BALANCED HYDRAULIC STEERING SYSTEM
Robert E. Schott, New Berlin, Wis., assignor to Allis-Chalmers Manufacturing Company, Milwaukee, Wis.
Filed July 1, 1968, Ser. No. 741,604
Int. Cl. B62d 5/00
U.S. Cl. 180—79.2
10 Claims

ABSTRACT OF THE DISCLOSURE

A balanced hydraulic steering system wherein a single rod end piston and hydraulic cylinder is used to operate the steering linkage of a vehicle and the degree of steering of the steerable wheels in either direction is in direct proportion to the angular rotation of the steering wheel from a neutral position.

---

This invention relates to a hydraulic steering system, and more particularly to a single rod end piston and hydraulic cylinder having an effective cross sectional area of the rod end pressure chamber bearing the ratio of one-half of that of the effective cross sectional area of the pressure chamber of the cylinder end of the actuator and a valve to supply pressurized fluid to said chambers for steering the steerable wheels in direct proportion to the angular rotation of the steering wheel.

Some conventional hydraulic steering systems use a double rod piston in the hydraulic cylinder which operates as a tie rod in the steering linkage, or two identical cylinders of which one operates to steer the wheels in a first direction and the second steers the vehicle in the opposite direction. With this type of a system a directional valve is used to direct the flow of hydraulic fluid to either side of the system to control the direction of steering of the vehicle. Either of these arrangements are expensive.

It is imperative that any hydraulic steering system must be balanced. In other words, the degree of steering in the right- or left-hand direction must be equal for a predetermined degree of rotation of the steering wheel in either direction. This can be accomplished by using a special valve arrangement with a cylinder and piston having a base end area exactly twice that of the rod end of the piston. The effective area upon which the pressurized fluid acts on the piston in either direction is equal. This provides the same stroke during extension or retraction of the piston as the volume of oil required to extend the cylinder is twice the volume required to retract it. The differential flow to the chambers is satisfied by using a steering valve combination which includes a directional valve with a metering device, and a balancing valve. For steering in a first direction and retraction of the piston within the cylinder, oil supplied by the source of pressurized fluid flows to the piston rod end chamber in the cylinder while oil from the base end chambers goes to the reservoir. When it is desired to extend the piston relative to its cylinder, the fluid from the rod end chamber is directed through the balance valve to the base end chamber of the piston in addition to pressurized fluid from the source. This gives an equal stroke in either direction and provides balanced steering for the hydraulic system.

It is an object of this invention to provide a balanced hydraulic steering system.

It is another object of this invention to provide a steering wheel controlled directional valve, a metering device, and a balance valve to control the flow of pressurized fluid to a single rod end hydraulic actuator operating a steering linkage.

It is a further object of this invention to provide a balanced hydraulic steering system wherein the hydraulic actuator operating the steering linkage defines two pressurized fluid chambers wherein the first has twice the fluid displacement of that of the second for unit linear movement of the piston and the flow of fluid is controlled by a directional valve, a metering device, and a balance valve.

The objects of this invention are accomplished by providing a hydraulic system which includes a source of pressurized fluid and a fluid reservoir. A directional valve receives fluid from the source and returns fluid to the reservoir when the valve is in neutral. The fluid flow is directed through a metering device and balance valve and to the hydraulic actuator when the vehicle is being steered. The balance valve has a unidirectional passage having connection to the directional valve and a rod end fluid chamber in the actuator. A second unidirectional passage is connected between the directional valve and the opposing cylinder end fluid chamber of the hydraulic actuator. A pressure responsive device in the balance valve controls flow through the second unidirectional passage simultaneously with the flow through the first unidirectional passage to place the two chambers in the fluid actuator. in communication with each other when fluid is flowing into the cylinder end fluid chamber in the fluid actuator. The differential flow between chambers provides an effective fluid displacement for extending of the actuator equal to the fluid displacement for retracting the actuator responsive to the degree of rotation or counterrotation of the steering wheel which operates the directional valve.

The preferred embodiment of this invention will be described in the subsequent paragraphs and is illustrated in the attached drawing.

The figure illustrates schematically the directional valve, metering device, and the steering linkage with the balance valve shown in cross section.

Referring to the drawing, the steerable wheels 1 and 2 are shown pivotally connected in the front axle 3 by means of the king pins 4 and 5, respectively. A bracket 6 is connected to the front axle 3 and pivotally supports the cylinder 7 from the actuator 8. A piston 9 is connected to the rod 10. The rod 10 extends from the actuator 8 and is pivotally connected to the arm 11 on the tie rod 12. The tie rod 12 extends between the steering arms 13 and 14 which pivot the steerable wheels 1 and 2.

The actuator 8 consists of a cylinder 7 carrying a piston 9 of which the cross sectional area of the piston 9 is equal to twice the cross sectional area of the rod 10. It can be seen that the effective area in the pressurized chamber 15 is equal to one-half the effective area in the chamber 16. This relationship is necessary to provide balanced steering wherein pressurized fluid in the system is supplied to either chamber 15, or chambers 15 and 16 depending on which way the vehicle wheels 1 and 2 will be steered.

The steering wheel 17 is supported on a column and rotates in a right- or left-hand direction depending on the direction in which the vehicle is to be steered. A pump 18 pumps fluid from the reservoir 19 and pressurizes fluid in the conduit 20 which is available for operating the steering system. Check valve 21 is positioned intermediate the conduits 20 and 22. Conduit 22 returns to reservoir 19. When the directional valve 23 is in a neutral position as shown, pressurized fluid is returned to the reservoir 19 and the vehicle is operating with the wheels steering the vehicle straight ahead.

The steering wheel 17 operates the directional valve 23, and the degree of rotation of the steering wheel controls the amount of pressurized fluid which flows through the valve 23 which is controlled by the metering device 24.

Referring to the directional valve 23, when the valve is in the neutral position as shown, the pressurized fluid is returned directly to the reservoir 19. When the directional valve is moved in the right-hand direction connecting section 71 of the valve 23, pressurized fluid will then flow through the conduit 26, metering device 24, and conduit 25 through the valve to conduit 27 to the balance valve 28 and actuator 8. The pressurized fluid in the chamber 15 is permitted to flow into chamber 16. The fluid flows through the balanced valve 28 to the opposite side of the piston 9, as the piston 9 is extended.

When the directional valve 23 is moved in the left-hand direction connecting section 70 of valve 23, the fluid from pump 18 flows into conduit 25 through the metering device 24, and conduit 26 through conduit 29 to the balance valve 28. The pressurized fluid then flows directly through the balance valve to the chamber 15 which contracts the actuator 8. Pressurized fluid in chamber 16 returns through conduit 30 and 27 through the directional valve to the reservoir 19. It is understood that a directional valve 23 is illustrated schematically. The flow of fluid through the metering device 24 and accordingly the flow through the system is in the direct response to the degree of angular rotation of the steering wheel 17. The metering device 24 and the directional valve 23 are mechanically connected to each other to provide fixed rotation both of which are responsive to angular rotation of the steering wheel and to the direction of rotation of the steering wheel which in turn controls the direction and degree of steering of the steerable wheels 1 and 2.

The balance valve 28 consists essentially of a housing 31 which defines an inlet port 32 which is connected to the conduit 29. Chamber 33 is in communication with inlet port 32 and connects to the chamber 34 which houses a unidirectional valve 35. The unidirectional valve consists essentially of a seat 36 and a ball 37 biased by the spring 38 to a closed position. Pressurized fluid is allowed to flow through the valve 35 into the passage 39 and chamber 40 which contains another valve 41.

Valve 41 consists of the valve seat 42, the ball 43 and spring 44 biasing the ball to a closed position on the seat 42. The valve 41 is held in position by the fitting 45 which is connected to a conduit 46 leading into the rod end chamber 15 of the actuator 8.

Similarly, conduit 27 is connected to a fitting 47 which fits into a central opening 48 containing the valve 49. The valve 49 consists of a valve seat 50 and a ball 51 spring biased by spring 52 to a closed position. Valve 49 in a simplified version of the balance valve may be eliminated.

Conduit 27 is connected to a fitting 52 to the pressure responsive plunger 53 which is spring biased to a left-hand position by the spring 54 which engages the annular facing 55 in chamber 33. The spring 54 engages a washer 56 which is locked against a collar 57 on the stem of the rod 58. The rod 58 extends through the chamber 59 and has a probe 60 which extends through the central opening of the valve 41 to engage the ball 43 and unseat it from its mating valve seat in response to movement of the plunger 53. This occurs when pressurized fluid in chamber 87 which overcomes pressure of spring 54 and unseats the valve element 43 from its mating seat to permit the flow of pressurized fluid from the rod end chamber 15 in actuator 8 through the balance valve 28 to the cylinder end chamber 16.

The operation of this invention will be described in the following paragraphs.

Referring to the drawing, the vehicle wheels 1 and 2 are shown in the central position in which the vehicle is traveling straight ahead and the valve 23 is positioned in the neutral position and the steering wheel 17 is turned to a central position. As the steering wheel 17 is rotated in a right-hand direction, the vehicle wheels 1 and 2 will steer in a right-hand direction. The steering is accomplished by shifting the directional valve 23 to the left causing pressurized fluid from the pump 18 to flow through section 70 of the valve 23. Pressurized fluid flows through conduit 29 into the chamber 33 and through the unidirectional valve 35. The pressurized fluid then flows through the chambers 39 and 40 and through conduit 46 to the rod end chamber 15 in the actuator 8. The pressurized fluid in chamber 15 contracts the rod 10 and piston 9 relative to the cylinder 7 causing a shortening of the actuator 8 and a steering of the vehicle wheels 1 and 2 in the right-hand direction. The fluid in chamber 16 is discharged through the conduits 30 and 27 and is returned to the reservoir 19 through the right-hand section 70 of the directional valve 23. The directional valve 23 is constructed in such a manner that the flow through the valve is directly proportional to the degree of turn of the steering wheel 17. In other words, for a predetermined angular rotation of the steering wheel 17 a predetermined amount of pressurized fluid will flow through the directional valve 23 and the metering device 24 which is transmitted through the balance valve 28. The effective area of the piston 16 in chamber 15 is the area of the piston exposed to pressurized fluid. The area equivalent to the cross sectional area of the rod 10 is ineffective in transmitting actuating force for the fluid actuator 8.

When the vehicle steering wheel 17 is rotated in a left-hand direction, the central valve 23 is moved to the right and the section 71 is operative for transmitting fluid for left-hand steering of the vehicle wheels 1 and 2. Pressurized fluid flows through the section 71, more specifically conduit 26 the metering device 24 and the conduit 25 and, thence, through conduits 27 and 30 to chamber 16. Pressurized fluid also operates on the plunger 53 biasing the plunger in a right-hand direction and causing the probe 60 to unseat the valve element 43 of unidirectional valve 41 allowing pressurized fluid from the chamber 15 to pass through valve 41 and into the chamber 59. The fluid then passes through a valve 49 and through conduit 30 into the left-hand side of the actuator into the chamber 16. The pressurized fluid in chamber 16 is not effective over the entire cross sectional area of the piston 9 but only effective as to the area equal to a cross sectional area of the rod 10. It is understood that pressurized fluid in chambers 15 and 16 cancel their effective forces because of the pressure on both sides of the piston in this area. The fluid is displaced from chamber 15 to chamber 16 to allow the piston to move in a manner to extend the rod 10 relative to the cylinder 7.

When steering in the left-hand direction, a portion of the fluid in chamber 33 is displaced due to the right-hand movement of the plunger 53 to unseat the valve element 43 in valve 41. The fluid in chamber 33 is allowed to flow through conduit 29 and is returned to a reservoir 19.

The actuator 8 extends and fluid is displaced from chamber 15 to chamber 16. When steering in the right-hand direction fluid in chamber 87 is displaced due to the left-hand movement of plunger 53 to allow valve element 43 in valve 41 to seat. Fluid in chamber 87 is allowed to flow through conduit 27 and return to the reservoir 19. Pressurized fluid acting in chamber 15 contracts the piston 9 relative to the cylinder 7. Accordingly, the effective displacement of fluid supplied from the pump 18 is an equal volume per unit displacement of the piston 9 in either directional movement of the piston. Plunger 53 displaces an equal amount of fluid from chamber 33 or 87 thereby keeping the system balanced.

The displacement of fluid from chamber 15 to chamber 16 is in effective in providing any actuating force as the forces of the pressurized fluid in the chambers are offsetting. Only pressurized fluid which is received from the pump 18 provides a driving force to extend the actuator 8. This force provides a steering force and the displacement of fluid in the chamber 16 extends the actuator and steers the vehicle wheels 1 and 2. When the vehicle wheels are returned to its central or neutral position, the valve 23 is also returned to the neutral position which aligns the section 72 of the central valve which prevents any flow through the directional valve. A pressurized fluid in the actuator maintains the neutral position or straight ahead position of the vehicle wheels 1 and 2.

The operation of the direction valve 23 is controlled by degree of rotation of the steering wheel. Metering device 24 meters the fluid at a rate responsive to the degree of angular rotation of the steering wheel. The balance valve 28 connects the passages to the actuator to provide fluid displacement in the actuator for extension or contraction of the actuator which in turn steers the vehicle.

The preferred embodiment of this invention has been illustrated and described and the scope will be defined by the attached claims.

The embodiments of the invention in which an exclusive property or privilege is claimed are defined as follows:

1. A hydrostatic steering system comprising a steering linkage, a hydraulic fluid actuator operating said steering linkage and having a power wall and a power transmitting rod connected to one side of said power wall defining a rod end fluid chamber and another fluid chamber adapted for receiving pressurized fluid, said power wall displacing in said rod end chamber one-half the volume of fluid displaced in said other chamber for unit linear movement of said power wall, a directional valve operating in response to angular rotation of the steering wheel having means defining an inlet port, a return port, and two hydraulic actuator ports, a metering device connected to said directional valve for simultaneous operation in response to rotation of said steering wheel to control the rate of flow in either of two directions through said valve in response to the degree of rotation of said steering wheel, a source of pressurized fluid connected to said inlet port of said directional valve, a reservoir connected to said return port of said directional valve, the first of said hydraulic actuator ports in said directional valve connected to the other chamber in said hydraulic actuator, a balance valve having an inlet opening connected to the second of said hydraulic actuator ports, a first passage means in said balance valve communicating with said inlet opening in said balance valve and with the rod end fluid chamber, a pressure responsive fluid control connected to the first hydraulic actuator port for controlling flow of pressurized fluid in said balance valve, a second passage selectively connecting the rod end fluid chamber in said hydraulic actuator with the other fluid chamber of said hydraulic actuator in response to said pressure responsive control, said pressure responsive control permitting the flow of pressurized fluid from said rod end chamber to said other chamber when pressurized fluid from said source of pressurized fluid is in communication with the other fluid chamber in said actuator to thereby provide steering in a first direction and said balanced valve providing steering in the opposite direction when said directional valve directs a flow of pressurized fluid through said first passage means in said balance valve to the rod end chamber of said actuator.

2. A hydrostatic steering system as set forth in claim 1 wherein said hydraulic actuator is a cylinder and rod connected between the front axle and the tie rod of the vehicle to provide steering of the vehicle by extension and retraction of said actuator.

3. A hydrostatic steering system as set forth in claim 1 wherein said first and second passage means in said balance valve are unidirectional.

4. A hydrostatic steering system as set forth in claim 1 wherein said balance valve provides communication between the source of pressurized fluid and the rod end fluid chamber of said hydraulic actuator and communication between the other fluid chamber of said hydraulic actuator and the reservoir to retract said actuator for steering of said vehicle wheels in one direction.

5. A hydrostatic steering system as set forth in claim 1 wherein the directional valve provides communication between said source of pressurized fluid and the other fluid chamber in said hydraulic actuator and to a plunger of said pressure responsive control to permit flow from the rod end fluid chamber to the other fluid chamber in said hydraulic actuator for steering of the vehicle wheels in another direction.

6. A hydrostatic steering system as set forth in claim 1 wherein the neutral position of said directional valve prevents fluid flow to the actuator through the balance valve and pressurized fluid is returned to the reservoir.

7. A hydrostatic steering system as set forth in claim 1 wherein the balance valve includes at least two check valves in connecting passages to control the flow of fluid through the balance valve.

8. A hydrostatic steering system as set forth in claim 1 wherein three check valves are connected through passage means to direct fluid flow to the rod end fluid chamber of said hydraulic actuator for steering in a first direction and one of the check valves is unseated by the pressure responsive control to permit fluid displacement from the rod end fluid chamber to the other fluid chamber for steering in the other direction.

9. A hydrostatic steering system as set forth in claim 1 wherein the pressure responsive control in said balance valve includes a plunger operating in response to pressurized fluid to unseat a valve element to thereby permit flow of fluid from the rod end chamber to the other chamber when pressurized fluid flows into said other chamber.

10. A hydrostatic steering system as set forth in claim 1 wherein the pressure responsive control in said balance valve includes a plunger displacing equal volumes of fluid in either direction of movement to maintain hydraulic balance in the valve and the system for balanced steering.

References Cited

UNITED STATES PATENTS

| | | | |
|---|---|---|---|
| 2,808,120 | 10/1957 | Hunter | 180—79.2 |
| 2,906,361 | 9/1959 | Ziskal | 180—79.2 X |
| 3,224,343 | 12/1965 | Nevulis | 91—436 |
| 3,348,493 | 10/1967 | Easton. | |

BENJAMIN HERSH, Primary Examiner

JOHN A. PEKAR, Assistant Examiner

U.S. Cl. X.R.

60—52; 91—436